Dec. 26, 1950         C. D. BRANSON         2,535,893
             CONSTANT FLOW MIXING VALVE
                 Filed Nov. 12, 1948
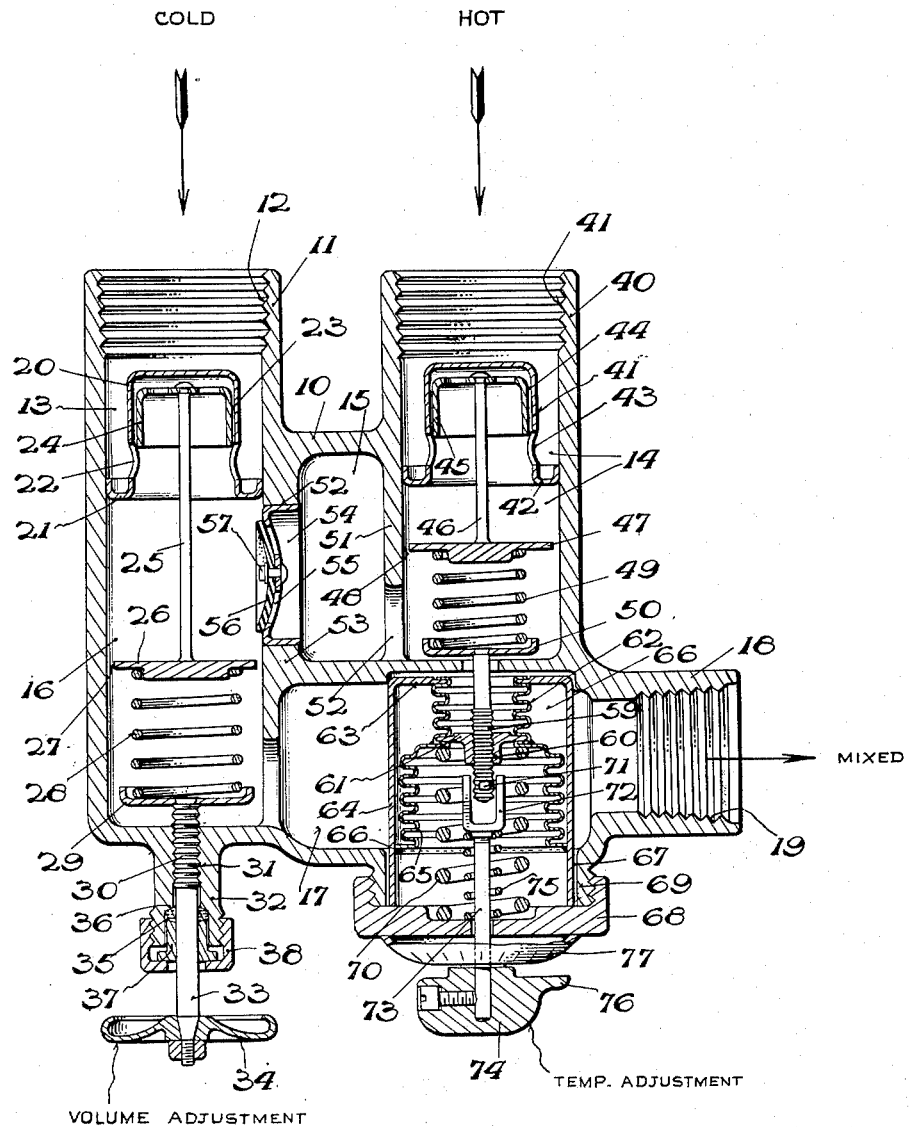
INVENTOR.
*Charles D. Branson*
BY
*Cameron, Kerkam & Sutton*
ATTORNEYS Patented Dec. 26, 1950

2,535,893

UNITED STATES PATENT OFFICE 2,535,893

CONSTANT FLOW MIXING VALVE

Charles D. Branson, Knoxville, Tenn., assignor to Robertshaw-Fulton Controls Company, Knoxville, Tenn., a corporation of Delaware Application November 12, 1948, Serial No. 59,533

12 Claims. (Cl. 236—12)

This invention relates to mixing valves, and more particularly to mixing valves for controlling the flow of hot and cold water to a shower head or the like so as to obtain a substantially constant flow of mixture at a predetermined temperature, although as will be apparent to those skilled in the art the invention is applicable to other uses where results comparable to those hereinafter explained are desired in controlling the flow of fluids where a substantially constant flow of a mixture of predetermined temperature is desired.

It is an object of the present invention to provide an improved device of the type characterized which avoids sudden spurts of either hot or cold fluid or comparable abrupt changes in the temperature of the mixture if there is a change in the pressure of either fluid flowing to the mixing chamber.

Another object of this invention is to provide an improved device of the type characterized wherein a substantially constant flow of mixture is assured at all times by controlling the rate of outflow from the mixing valve by a constant flow mechanism disposed in the mixing chamber.

Another object of this invention is to provide an improved device of the type just characterized wherein a substantially constant predetermined temperature is maintained in the mixture.

Another object of this invention is to provide an improved device of the type last characterized wherein the constant flow mechanism for controlling the flow of mixture acts directly on only one of the valves for controlling the inflow of the fluids to be mixed while the thermostatic mechanism for maintaining a substantially constant predetermined temperature operates through a second valve mechanism to control the prorationing of the fluids to be mixed.

Another object of this invention is to provide an improved device of the type last characterized wherein the thermostatically operated valve mechanism is itself so constructed as to maintain a substantially constant flow of the fluid which it is controlling.

Another object of this invention is to provide an improved device of the type above characterized wherein the constant flow mechanism for maintaining a substantially constant flow through the mixing chamber may be adjusted to vary the rate of flow.

Another object of this invention is to provide an improved device of the type above characterized wherein the thermostatically controlled valve mechanism may be adjusted so as to vary the temperature of the mixture being delivered by varying the rate of flow of the fluid controlled by the thermostat.

Another object of this invention is to provide an improved device of the type above characterized which is relatively simple in construction, which is composed of parts that are inexpensive to manufacture and assemble, and which is highly efficient in operation.

Other objects will appear as the description of the invention proceeds.

The invention is capable of receiving a variety of mechanical expressions only one of which is shown on the accompanying drawing, and it is therefore to be expressly understood that the drawing is for purposes of illustration only, and is not to be construed as a definition of the limits of the invention, reference being had to the appended claims for that purpose.

The drawing illustrates somewhat diagramatically an improved mixing valve embodying the present invention for producing a substantially constant flow of a mixture of hot and cold water of predetermined temperature for delivery to a shower head or the like.

Referring in detail to the drawing, 10 designates a valve housing of any suitable size, construction and material. Housing 10 has a suitable nipple 11, here shown as threaded at 12 for connection with any suitable line leading to a source of cold water, and which nipple or line may be provided with any suitable filter and check valve, not shown for purposes of simplification.

Housing 10 as shown is provided with suitable internal partitions, walls or the like so that its interior is provided with a cold water chamber 13, a hot water chamber 14, illustrated as provided with an extension 15, a mixing chamber 16 and a thermostat chamber 17 which, as illustrated, is an extension of the mixing chamber 16. A suitable nipple 18 communicates with the mixing chamber 16 through the thermostat chamber 17, the same being shown as threaded at 19 for connection to any suitable line leading to the place of consumption, as the shower head of a shower bath.

Disposed in cold water chamber 13 is a cold water valve of any suitable construction, here shown as composed of a cup-shaped member 20, having a peripheral flange 21 by which it may be suitably secured within the cold water chamber, and having one or more suitable ports 22 in its lateral wall. Slidably mounted within said cup-shaped member 20 is a valve member 23, also shown as of cup-shaped formation and having its skirt 24 so disposed with respect to the ports 22 that it functions as a sleeve valve to open or close or vary the opening of said ports 22. Valve member 23 has extending therefrom and secured thereto in any suitable way a stem 25 which, at its opposite end, is operatively connected to constant flow mechanism disposed in the mixing chamber 16. As illustrated, the constant flow mechanism comprises a disk 26 which provides an orifice of predetermined area, as by having a predetermined clearance 27 between the periphery of the disk 26 and the inner face of the wall of the hot water chamber 16. Cooperating with said disk 26 is a coil spring 28 which reacts between said disk and an adjustable spring seat 29 to be explained.

Said constant flow mechanism operates on the principle that, given an orifice of predetermined area, a constant flow of fluid is obtained when the pressure differential across said orifice is constant. It will be observed that both faces of the disk 26 are subjected to the water flowing through the mixing chamber 16, and as said faces have substantially equal effective areas, it follows that the area of said disk on its upstream side, multiplied by the liquid pressure acting thereon, must be equal, when the parts are in equilibrium due to balanced pressures, to the area of said disk on its downstream side multiplied by the fluid pressure acting thereon plus the tension of the coil spring 28. Otherwise expressed, the difference between the effective pressures on the opposite faces of the disk 26 is equal to the tension of the spring 28, which therefore defines a substantially constant pressure differential across the orifice of predetermined area constituted by the aforesaid clearance 27. Accordingly, a substantially constant liquid flow is maintained through the mixing chamber as predetermined by the area of said orifice and the tension of said spring.

In order to vary the substantially constant flow provided by the disk 26, suitable means are provided for adjusting the tension of said spring 28. To this end the spring seat 29 is shown as mounted on a threaded spindle 30 which cooperates with the internal threads of a threaded opening 31 provided in a collar 32 on the housing 10. Spindle 30 has an unthreaded portion 33 which extends to the exterior of the collar 32 where it is provided with any suitable handgrasp, handle or the like 34. Any suitable gland may be associated with said spindle to prevent leakage through the opening 31, packing 35 being shown as compressed against the seat 36 and around the spindle portion 33 by a sleeve 37 held in position by an interiorly threaded thimble 38 cooperating with exterior threads on the collar 32. Suitable indicating means may be associated with the handle 34 if desired.

Housing 10 is also provided with a hot water nipple 40 of any suitable construction, shown as threaded at 41 for attachment to any suitable line leading to a source of hot water. Nipple 40 or its communicating line may be provided with any suitable filter and check valve, not shown for purposes of simplification. Nipple 40 communicates with the hot water chamber 14 and contains a hot water valve which may be, and is shown as, of identical construction with the cold water valve in the cold water chamber 13. As shown, a cup-shaped member 41 has a peripheral flange 42, by which it may be suitably secured in the hot water chamber, and one or more suitable ports 43 in its lateral wall. Slidably mounted within said cup-shaped member 41 is a valve member 44, also shown as of cup-shaped formation and having its skirt 45 so disposed with respect to the ports 43 that it functions as a sleeve valve to open or close or vary the opening of said ports 43. Valve member 44 has extending therefrom and secured thereto in any suitable way a stem 46 which, at its opposite end, is operatively connected to constant flow mechanism disposed in the hot water chamber 14. Said constant flow mechanism may be, and is shown as, of identical construction with the constant flow mechanism provided in the mixing chamber 16. As illustrated, it comprises a disk 47 which provides an orifice of predetermined area, as by having a predetermined clearance 48 between the periphery of the disk 47 and the inner face of the wall of the hot water chamber 14. Cooperating with said disk 46 is a coil spring 49 which reacts between said disk and an adjustable spring seat 50 hereinafter to be explained.

As illustrated, hot water chamber 14 has an extension 15 formed by an interior wall or partition 51 provided with one or more apertures 52, although if preferred chamber 15 may be continuous with chamber 14. Chamber 15 communicates with the mixing chamber 16 through an aperture 52 provided in a separating wall 53, said aperture preferably containing a check valve of any suitable construction, shown as comprising a cup-shaped member 54 having suitable apertures 55 in its bottom wall and carrying at the exterior face of said bottom wall a flexible or resilient disk 56 secured to said bottom wall as by a bolt, rivet or the like 57. Disk 56 is preferably formed of rubber, neoprene or similar elastic material so that when subjected to pressure through the apertures 55 it will flex and permit water to flow from the chamber 15 to the chamber 14, but if the water pressure in chamber 16 exceeds that in chamber 15 the excess pressure in chamber 16 holds disk 56 against the bottom wall of cup-shaped member 54 so as to close the apertures 55 and prevent reverse flow of the water.

The spring seat 50 for spring 49 is thermostatically adjustable so as to vary the tension of the spring 49 in conformity with fluctuations of temperature in the mixture to which the thermostat is subjected. Also, as hereinafter explained, spring seat 50 is also preferably made manually adjustable so that the temperature to be maintained by the thermostat may be varied by manually adjusting the tension of the spring 49.

As illustrated, spring seat 50 is carried by a threaded spindle 59 which cooperates with the interior threads of a collar 60 mounted on or forming an integral part of a movable end wall member 61. Hermetically sealed to the periphery of said movable end wall member 61 is an expansible and collapsible corrugated tubular wall or bellows 62 whose opposite end is hermetically sealed in an opening provided in the bottom wall 63 of a cup-shaped member 64 which surrounds said bellows 63. Also hermetically sealed to the periphery of said movable end wall member 61 is a second expansible and collapsible corrugated tubular wall or bellows 65 whose opposite end is hermetically sealed at 66 to the lateral wall of said cup-shaped member 64. Cup-shaped member 64 together with the bellows 62 and 65 thereby provides an expansible and collapsible chamber 66 which may be charged with any suitable thermosensitive fluid and constitute a thermostat.

The thermostat so provided by the cup-shaped member 64 and bellows 62 and 65 is secured in an opening 67 in the wall of the thermostat chamber 17 and through which opening the thermostat may be introduced into or withdrawn from said thermostat chamber. As shown said thermostat abuts against and may be secured to an internally threaded thimble 68 cooperating with an exteriorly threaded collar 69 formed on the housing 10 and surrounding said opening 67. Interposed between the movable end wall member 61 and the inner face of said thimble 68 is a coil spring 70 which opposes expansion of the chamber 66 and assures contraction of said chamber upon contraction or condensation of the thermosensitive fluid therein.

Suitable means are also preferably provided for adjusting the threaded spindle 59 so as to vary the tension of the spring 49 independently of the expansion or contraction of the thermostat. As illustrated, threaded spindle 59 extends to the exterior of the collar 69 and is provided with a transverse pin 71. Embracing the end of spindle 59 for engagement with and actuation of said transverse pin 71 is a fork 72 which may take the form of a tube having diametrically disposed slots to receive said transverse pin. Said fork is mounted on a stem 73 which extends through a suitable opening in the thimble 68 and is provided exteriorly of said thimble with any suitable handle, handgrasp or the like 74. Fork 72 is held in proper relationship to the threaded spindle 59 and transverse pin 71 by a coil spring 75 reacting between said fork and the inner face of the thimble 68. Handle 74 may be provided with any suitable pointer 76 for cooperation with suitable indicia 77 which may be provided in any suitable way on the exterior face of the thimble 68.

For any given setting of the springs 28 and 49, a substantially constant flow of hot water into the mixing chamber is maintained by reason of the constant flow mechanism provided by the disk 47 and its associated spring 49 that maintains a constant pressure differential across the aperture 48 between the opposing faces of said disk 47, while a substantially constant flow of the mixture is maintained through the mixing chamber 16 by the disk 26 and its associated spring 28 which maintains a substantially constant pressure differential across the orifice 27. If the pressure of the hot water increases so as to increase the pressure at the upstream side of the disk 26, disk 26 is moved downwardly, as viewed in the drawing, against the tension of the spring 28, and thereby decreases the cold water inflow by restricting the ports 22 until the flow through the mixing chamber 16 is restored to its predetermined substantially constant value. A decrease in the hot water pressure similarly causes an upward movement of the disk 26, as viewed in the drawing, to increase the cold water inflow and re-establish the substantially constant flow. Similarly, fluctuations in the cold water pressure will produce comparable movements of the disk 26 and maintain the predetermined substantially constant flow.

For any given setting of the spring 49, the constant flow mechanism 47, 48, 49 maintains a substantially constant flow of the hot water into and through the hot water chamber. However, it is the function of the thermostat heretofore described to alter the substantially constant rate of flow of the hot water so as to obtain such a prorationing of the hot and cold fluids that a mixture which is of substantially constant temperature will be obtained. If the temperature of the mixture increases above the predetermined temperature for which the valve is set, the charge in chamber 66 expands, depressing the movable end wall 61 as viewed in the drawing and correspondingly relieving the tension on the spring 49. As the substantially constant flow of hot water across the orifice 48 is determined by the tension of the spring 49, the lesser tension on the spring 49 results in a decrease in the constant flow of hot water through chamber 14. This in turn decreases the pressure on the upstream side of the disk 26 in chamber 16, resulting in an increased inflow of cold water, the decreased flow of hot water and the increased flow of cold water lowering the temperature of the mixture, but the rate of flow of the mixture is still maintained substantially constant by the constant flow mechanism 26, 27, 28 as predetermined by the tension of the spring 28. Conversely, if the mixture decreases below its predetermined temperature the charge in chamber 66 contracts so that the movable end wall 61 moves upwardly as viewed in the drawing, due to spring 70, increasing the tension of the spring 49 and, in conformity with the principles above explained, thereby increasing the rate of flow through the orifice 48. The increased pressure of hot water delivered to the chamber 16 thereupon results in the constant flow mechanism decreasing the inflow of cold water, but the rate of flow through the mixing chamber is still maintained substantially constant by the constant flow mechanism in the mixing chamber.

The rate of flow through the mixing chamber may be varied by varying the tension of the spring 28. With valve member 23 abutted against the bottom of cup-shaped member 20, rotation of the stem 33 by handgrasp 34 will cause the spring seat 29 to move upwardly or downwardly as viewed in the drawing, depending upon the direction of rotation of said stem, to increase or decrease the tension of said spring 28 and thereby vary the pressure differential that must exist across the orifice 27. Similarly, the tension of the spring 49 may be adjusted independently of the thermostat by rotating the stem 73 from handle 74 to rotate the fork 72, the latter, through engagement with cross pin 71, rotating the threaded stem 59 in one direction or the other to move the spring seat 50 upwardly or downwardly as viewed in the drawing. Again, with the valve member 44 abutted against the bottom of the cup-shaped member 41, such movement of the spring seat varies the tension of the spring 49 to predetermine the pressure differential existing across the orifice 48. Thereby the rate of flow of the hot water through the hot water chamber 14 is varied and the proportion of hot water delivered to the mixing chamber 16 is increased or decreased. Thereafter, with any given manual setting of the spring 49, the thermostat operates as heretofore explained to increase or decrease the pressure of the spring 49 and thereby the pressure differential that must exist across the orifice 48 to maintain such a substantially constant flow of the hot water as will maintain the predetermined temperature of the mixture.

In all settings of the mixing valve, a substantially constant flow of liquid through the mixing chamber and across the thermostat to the outlet nipple 19 is maintained by the constant flow mechanism 26, 27, 28, the rate of such flow being predetermined by the tension of spring 28. If there are any fluctuations in pressure of either of the liquids being mixed the constant flow mechanism is immediately and automatically adjusted in conformity with the existing pressures to reestablish the constant flow. At the same time a substantially constant temperature is maintained in said substantially constant flow because the mixture flowing through the mixing chamber to the outlet nipple goes into direct heat interchanging relationship with the thermostat which promptly responds to the temperature of the mixture so as to vary the rate of inflow of the hot water to offset any fluctuations of temperature of the mixture. While such adjustments in the rate of flow of hot water effect changes of pressure in the mixing chamber with a concomitant adjustment of the cold water inlet flow by the action of the constant flow mechanism 26, 27, 28, the two valve mechanisms are cooperating at all times to establish an equilibrium quickly whereby a substantially constant flow of water at a substantially constant temperature is maintained.

It will therefore be perceived that variations in pressure in the liquids to be mixed do not result in sudden spurts of hot or cold water or abrupt changes in the temperature of the mixture. As long as conditions remain static substantially constant flows of both the hot and cold water are maintained, effecting a substantially constant flow of the mixture. Any fluctuation of temperature immediately causes an appropriate readjustment of the valve mechanisms, in conformity with the principles heretofore explained, so as to reestablish promptly the predetermined temperature for the substantially constant flow of mixture. It will also be observed that the mixing valve of the present invention is composed of parts which are simple to fabricate and assemble, the desired adjustments are easily made, and a highly efficient operation is assured in maintaining a substantially constant flow at a predetermined temperature.

While the embodiment of the invention illustrated on the drawing has been described with considerable particularity it is to be expressly understood that the invention is not limited thereto as the same is capable of receiving a variety of mechanical expressions, some of which will now readily suggest themselves to those skilled in the art, while changes may be made in the details of construction, arrangement, proportion, size, etc., and parts may be replaced by equivalent parts, without departing from the spirit of this invention. Reference is therefore to be had to the appended claims for a definition of said invention.

What is claimed is:

1. In a device of the character described, in combination with a housing providing a mixing chamber, an outlet passage for communication with said mixing chamber, an inlet passage for one of the fluids to be mixed communicating with said mixing chamber, and a second inlet passage for the other fluid to be mixed having means of communication with said mixing chamber, valve mechanism in said first named inlet passage, constant flow mechanism in said mixing chamber for maintaining a substantially constant flow of fluid therethrough and directly connected to said valve mechanism, a second valve mechanism in said second named inlet passage having constant flow mechanism operatively connected thereto, and a thermostat subjected to the temperature of the mixture and operatively connected to said last named constant flow mechanism.

2. In a device of the character described, in combination with a housing providing a mixing chamber, an outlet passage for communication with said mixing chamber, an inlet passage for one of the fluids to be mixed communicating with said mixing chamber, and a second inlet passage for the other fluid to be mixed having means of communication with said mixing chamber, valve mechanism in said first named inlet passage, constant flow mechanism in said mixing chamber for maintaining a substantially constant flow of fluid therethrough and directly connected to said valve mechanism, a second valve mechanism in said second named inlet passage having constant flow mechanism operatively connected thereto, and a thermostat subjected to the temperature of the mixture and operatively connected to said last named constant flow mechanism, said first named constant flow mechanism including a disk disposed in said mixing chamber and providing an orifice of predetermined area, a spring cooperating with said disk for predetermining the pressure drop across said orifice, and means for adjusting said spring to vary the rate of flow through said orifice.

3. In a device of the character described, in combination with a housing providing a mixing chamber, an outlet passage for communication with said mixing chamber, an inlet passage for one of the fluids to be mixed communicating with said mixing chamber, and a second inlet passage for the other fluid to be mixed having means of communication with said mixing chamber, valve mechanism in said first named inlet passage, constant flow mechanism in said mixing chamber for maintaining a substantially constant flow of fluid therethrough and directly connected to said valve mechanism, a second valve mechanism in said second named inlet passage having constant flow mechanism operatively connected thereto, and a thermostat subjected to the temperature of the mixture and operatively connected to said last named constant flow mechanism, said second named constant flow mechanism including a disk operatively connected to said second named valve mechanism and providing an orifice of predetermined area and a spring reacting between said thermostat and said disk for adjusting the tension of said spring upon expansion and contraction of said thermostat.

4. In a device of the character described, in combination with a housing providing a mixing chamber, an outlet passage for communication with said mixing chamber, an inlet passage for one of the fluids to be mixed communicating with said mixing chamber, and a second inlet passage for the other fluid to be mixed having means of communication with said mixing chamber, valve mechanism in said first named inlet passage, constant flow mechanism in said mixing chamber for maintaining a substantially constant flow of fluid therethrough and directly connected to said valve mechanism, a second valve mechanism in said second named inlet passage having constant flow mechanism operatively connected thereto, and a thermostat subjected to the temperature of the mixture and operatively connected to said last named constant flow mechanism, said second named constant flow mechanism including a disk operatively connected to said second named valve mechanism and providing an orifice of predetermined area, a spring reacting between said thermostat and said disk for adjusting the tension of said spring upon expansion and contraction of said thermostat, and manual means operable independently of said thermostat for adjusting the tension of said spring.

5. In a device of the character described, in combination with a housing providing a mixing chamber, an outlet passage for communication with said mixing chamber, an inlet passage for one of the fluids to be mixed communicating with said mixing chamber, and a second chamber having an inlet passage for the other fluid to be mixed and communicating with said mixing chamber, valve mechanism for predetermining the flow of fluid from said last named inlet passage into said second chamber, constant flow mechanism disposed in said second chamber and operatively connected to said valve mechanism, a second valve mechanism in said first named inlet passage for controlling the flow of fluid therethrough to said mixing chamber, a thermostat subjected to the temperature of the mixture and operatively connected to said first named valve mechanism for prorationing the rate of flow of fluid past said first named valve mechanism to predetermine the temperature of the mixture, and a constant flow mechanism in said mixing chamber operatively connected to said second valve mechanism for adjusting the same to compensate for variations in the rate of flow provided by said first named valve mechanism in order to maintain a substantially constant flow of fluid through said mixing chamber.

6. In a device of the character described, in combination with a housing providing a mixing chamber, an outlet passage for communication with said mixing chamber, an inlet passage for one of the fluids to be mixed communicating with said mixing chamber, and a second chamber having an inlet passage for the other fluid to be mixed and communicating with said mixing chamber, valve mechanism for predetermining the flow of fluid from said last named inlet passage into said second chamber, constant flow mechanism disposed in said second chamber and operatively connected to said valve mechanism, a second valve mechanism in said first named inlet passage for controlling the flow of fluid therethrough to said mixing chamber, a thermostat subjected to the temperature of the mixture and operatively connected to said first named valve mechanism for prorationing the rate of flow of fluid past said first named valve mechanism to predetermine the temperature of the mixture, and a constant flow mechanism in said mixing chamber operatively connected to said second valve mechanism for adjusting the same to compensate for variations in the rate of flow provided by said first named valve mechanism in order to maintain a substantially constant flow of fluid through said mixing chamber, said first named constant flow mechanism including a disk operatively connected to said first named valve mechanism and providing an orifice of predetermined area and a spring interposed between said disk and said thermostat for predetermining the pressure differential across said orifice and adjustable by the expansion and contraction of said thermostat.

7. In a device of the character described, in combination with a housing providing a mixing chamber, an outlet passage for communication with said mixing chamber, a cold water inlet passage communicating with said mixing chamber, and a hot water inlet passage having means of communication with said mixing chamber, valve mechanism for pre-determining the inflow of hot water from said hot water inlet passage, constant flow mechanism associated with said valve mechanism for maintaining a substantially constant rate of hot water inflow, a second valve mechanism in said cold water inlet passage for controlling the admission of cold water to said mixing chamber, a constant flow mechanism in said mixing chamber operatively connected to said second valve mechanism for maintaining a substantially constant flow of water through said mixing chamber, and a thermostat subjected to the temperature of said mixture and operatively connected to said first named constant flow mechanism to adjust the latter and prorate the proportion of hot water admitted to said mixing chamber.

8. In a device of the character described, in combination with a housing providing a mixing chamber, an outlet passage for communication with said mixing chamber, a cold water inlet passage communicating with said mixing chamber, and a hot water inlet passage having means of communication with said mixing chamber, valve mechanism for predetermining the inflow of hot water from said hot water inlet passage, constant flow mechanism associated with said valve mechanism for maintaining a substantially constant rate of hot water inflow, a second valve mechanism in said cold water inlet passage for controlling the admission of cold water to said mixing chamber, a constant flow mechanism in said mixing chamber operatively connected to said second valve mechanism for maintaining a substantially constant flow of water through said mixing chamber, and a thermostat subjected to the temperature of said mixture and operatively connected to said first named constant flow mechanism to adjust the latter and prorate the proportion of hot water admitted to said mixing chamber, said first named constant flow mechanism including disk providing an orifice of predetermined area, a spring cooperating with said disk for predetermining the pressure drop across said orifice, and means for adjusting said spring to vary the rate of flow through said orifice.

9. In a device of the character described, in combination with a housing providing a mixing chamber, an outlet passage for communication with said mixing chamber, a cold water inlet passage communicating with said mixing chamber, and a hot water inlet passage having means of communication with said mixing chamber, valve mechanism for predetermining the inflow of hot water from said hot water inlet passage, constant flow mechanism associated with said valve mechanism for maintaining a substantially constant rate of hot water inflow, a second valve mechanism in said cold water inlet passage for controlling the admission of cold water to said mixing chamber, a constant flow mechanism in said mixing chamber operatively connected to said second valve mechanism for maintaining a substantially constant flow of water through said mixing chamber, and a thermostat subjected to the temperature of said mixture and operatively connected to said first named constant flow mechanism to adjust the latter and prorate the proportion of hot water admitted to said mixing chamber, said first named constant flow mechanism including a disk operatively connected to said first named valve mechanism and providing an orifice of predetermined area and a spring reacting between said thermostat and said disk for adjusting the tension of said spring upon expansion and contraction of said thermostat.

10. In a device of the character described, in combination with a housing providing a mixing chamber, an outlet passage for communication with said mixing chamber, a cold water inlet passage communicating with said mixing chamber, and a hot water inlet passage having means of communication with said mixing chamber, valve mechanism for predetermining the inflow of hot water from said hot water inlet passage, constant flow mechanism associated with said valve mechanism for maintaining a substantially constant rate of hot water inflow, a second valve mechanism in said cold water inlet passage for controlling the admission of cold water to said mixing chamber, a constant flow mechanism in said mixing chamber operatively connected to said second valve mechanism for maintaining a substantially constant flow of water through said mixing chamber, a thermostat subjected to the temperature of said mixture and operatively connected to said first named constant flow mechanism to adjust the latter and prorate the proportion of hot water admitted to said mixing chamber, and manual means operable independently of said thermostat for adjusting said first named constant flow mechanism.

11. In a device of the character described, the combination of a housing providing a mixing chamber, an outlet passage for communication with said mixing chamber, a cold water inlet passage communicating with said mixing chamber, and a hot water chamber communicating with said mixing chamber and having a hot water inlet passage communicating therewith, valve mechanism in said cold water inlet passage, constant flow mechanism in said mixing chamber for maintaining a substantially constant flow of fluid therethrough and operatively connected to said valve mechanism, a second valve mechanism in said hot water inlet passage, a constant flow mechanism in said hot water chamber operatively connected to said last named valve mechanism for controlling the rate of admission of hot water to said mixing chamber, and a thermostat subjected to the temperature of the mixture and operatively connected to said last named constant flow mechanism to vary the rate at which said hot water is admitted to said mixing chamber.

12. In a device of the character described, the combination of a housing providing a mixing chamber, an outlet passage in communication with said mixing chamber, a cold water inlet passage communicating with said mixing chamber, and a hot water inlet passage having means of communication with said mixing chamber, means for maintaining a substantially constant flow of predetermined temperature through said mixing chamber including valve mechanism in said hot water inlet passage having constant flow mechanism operatively connected therewith to predetermine the rate of admission of hot water, a thermostat subjected to the temperature of the mixture and operatively connected with said valve mechanism to vary the rate of inflow of hot water, a second valve mechanism in said cold water inlet passage, and a constant flow mechanism in said mixing chamber operatively connected to said second valve mechanism to adjust the same and compensate for variations in the rate of inflow of hot water in order to maintain a substantially constant flow of fluid through said mixing chamber.

CHARLES D. BRANSON.

REFERENCES CITED

The following references are of record in the file of this patent:

UNITED STATES PATENTS

| Number | Name | Date |
|---|---|---|
| 1,942,270 | Resek | Jan. 2, 1934 |